US011687263B2

United States Patent
Agarwal et al.

(10) Patent No.: US 11,687,263 B2
(45) Date of Patent: Jun. 27, 2023

(54) FULL DIE RECOVERY IN ZNS SSD

(71) Applicant: Western Digital Technologies, Inc., San Jose, CA (US)

(72) Inventors: Vineet Agarwal, Bangalore (IN); Chaitanya Kavirayani, Bangalore (IN); Ratanvel Nadar, Bangalore (IN)

(73) Assignee: Western Digital Technologies, Inc., San Jose, CA (US)

( * ) Notice: Subject to any disclaimer, the term of this patent is extended or adjusted under 35 U.S.C. 154(b) by 6 days.

(21) Appl. No.: 17/539,793

(22) Filed: Dec. 1, 2021

(65) Prior Publication Data
US 2023/0168826 A1   Jun. 1, 2023

(51) Int. Cl.
G06F 3/06 (2006.01)

(52) U.S. Cl.
CPC ............ *G06F 3/064* (2013.01); *G06F 3/0619* (2013.01); *G06F 3/0652* (2013.01); *G06F 3/0659* (2013.01); *G06F 3/0679* (2013.01)

(58) Field of Classification Search
CPC ...... G06F 3/064; G06F 3/0619; G06F 3/0652; G06F 3/0659; G06F 3/0679
See application file for complete search history.

(56) References Cited

U.S. PATENT DOCUMENTS

| | | |
|---|---|---|
| 10,055,295 B2 | 8/2018 | Chinnakkonda Vidyapoornachary et al. |
| 10,861,581 B2 | 12/2020 | Park |
| 2017/0286286 A1 | 10/2017 | Szubbocsev |
| 2018/0373438 A1 | 12/2018 | Bennett et al. |
| 2020/0027520 A1 | 1/2020 | Chu et al. |
| 2020/0042201 A1 | 2/2020 | Huang et al. |
| 2020/0133838 A1* | 4/2020 | Park .................. G06F 11/1048 |
| 2020/0409589 A1 | 12/2020 | Bennett et al. |
| 2021/0019080 A1 | 1/2021 | Koo et al. |
| 2021/0303424 A1 | 9/2021 | Jain |

OTHER PUBLICATIONS

Maddah Rakan, et al, Data Dependent Sparing to Manage Better-Than-Bad Blocks, IEEE Computer Architecture Letters, 2012, Jun. 26, vol. 12, No. 2, pp. 43-46.

* cited by examiner

Primary Examiner — David Yi
Assistant Examiner — Dustin B. Fulford
(74) Attorney, Agent, or Firm — Patterson + Sheridan, LLP; Steven H. VerSteeg

(57) ABSTRACT

A data storage device includes a memory device and a controller coupled to the memory device. The controller is configured to receive a request from a requester for a superblock, determine that one or more blocks of a die of the superblock are expected to fail, and either replace the one or more blocks of the die with another one or more blocks from a different die or add the another one or more blocks from the different die and disable the one or more blocks of the die, and provide the superblock to the requester. The superblock provided to the requester is erased prior to the providing and is the same size as an original superblock.

18 Claims, 7 Drawing Sheets

FULL DIE RECOVERY IN ZNS SSD

BACKGROUND OF THE DISCLOSURE

Field of the Disclosure

Embodiments of the present disclosure generally relate to data storage devices, such as a solid state drive (SSD), and, more specifically, full die recovery.

Description of the Related Art

A data storage device includes one or more memory devices to store data sent by a host device and/or data generated by the data storage device. Blocks of a memory device are logically aggregated into a superblock (SB), such that a SB includes one or more blocks from each die of the memory device. ZNS SSDs are a class of SSDs that supports either sequential only zones or zone random write area (ZRWA). In a sequential only zones ZNS SSD, zone data is written sequentially without overwrites. However, in a ZRWA ZNS SSD, zones are written to randomly and with overwrites. Typically, ZNS SSDs support sequential only zones. In order to overwrite a sequential zone, the zone must be reset before writing to the zone again. A zone reset is an un-mapping of all the data in the zone. When a data storage device supports multiple active zones, each zone should be mapped to a superblock.

When a program/erase failure is experienced at a SB by a client, such as a writer, a logger, and a recycler (e.g., garbage collection module), the client requests a new SB after sharing the failing die information with a flash array manager (FAM) of the data storage device. The failing die information is an indicator that the client has witnessed a failure from the respective die and that another potential failure for the respective die may occur in a subsequent operation. The FAM then skips the block or blocks of the failed die from the active blocks list in the next SB allocation for the host device. The block or blocks skipped by the FAM results in a reduced SB size that is provided to the host device.

Therefore, there is a need in the art for an improved die recovery without reducing the size of the superblock allocated to a host device.

SUMMARY OF THE DISCLOSURE

The present disclosure generally relates to data storage devices, such as a solid state drive (SSD), and, more specifically, full die recovery. A data storage device includes a memory device and a controller coupled to the memory device. The controller is configured to receive a request from a requester for a superblock, determine that one or more blocks of a die of the superblock are expected to fail, and either replace the one or more blocks of the die with another one or more blocks from a different die or add the another one or more blocks from the different die and disable the one or more blocks of the die, and provide the superblock to the requester. The superblock provided to the requester is erased prior to the providing and is the same size as an original superblock.

In one embodiment, a data storage device includes a memory device and a controller coupled to the memory device. The controller is configured to receive a request from a requester for a superblock, determine that one or more blocks of a die of the superblock are failing, either replace the one or more blocks of the die with another one or more blocks from a different die or add the another one or more blocks from the different die and disable the one or more blocks of the die, and provide the superblock to the requester.

In another embodiment, a data storage device includes a memory device and a controller coupled to the memory device. The controller is configured to determine that failing die information for a superblock is present for a host device, fetch the superblock from a spare superblock list, determine a location of one or more failing blocks of a die corresponding to the failing die information for the superblock, and reform the superblock.

In another embodiment, a data storage device includes memory means and a controller coupled to the memory means. The controller is configured to retrieve a superblock that has a die comprising one or more failed blocks, determine if a spare block count of the die is above or equal to a maximum threshold, add one or more new blocks from a different die and disable the one or more failed blocks of the die, erase the superblock, and return the superblock to a requester.

BRIEF DESCRIPTION OF THE DRAWINGS

So that the manner in which the above recited features of the present disclosure can be understood in detail, a more particular description of the disclosure, briefly summarized above, may be had by reference to embodiments, some of which are illustrated in the appended drawings. It is to be noted, however, that the appended drawings illustrate only typical embodiments of this disclosure and are therefore not to be considered limiting of its scope, for the disclosure may admit to other equally effective embodiments.

To facilitate understanding, identical reference numerals have been used, where possible, to designate identical elements that are common to the figures. It is contemplated that elements disclosed in one embodiment may be beneficially utilized on other embodiments without specific recitation.

DETAILED DESCRIPTION

In the following, reference is made to embodiments of the disclosure. However, it should be understood that the disclosure is not limited to specifically described embodiments. Instead, any combination of the following features and elements, whether related to different embodiments or not, is contemplated to implement and practice the disclosure. Furthermore, although embodiments of the disclosure may achieve advantages over other possible solutions and/or over the prior art, whether or not a particular advantage is achieved by a given embodiment is not limiting of the disclosure. Thus, the following aspects, features, embodiments, and advantages are merely illustrative and are not considered elements or limitations of the appended claims except where explicitly recited in a claim(s). Likewise, reference to "the disclosure" shall not be construed as a generalization of any inventive subject matter disclosed herein and shall not be considered to be an element or limitation of the appended claims except where explicitly recited in a claim(s).

The present disclosure generally relates to data storage devices, such as a solid state drive (SSD), and, more specifically, full die recovery. A data storage device includes a memory device and a controller coupled to the memory device. The controller is configured to receive a request from a requester for a superblock, determine that one or more blocks of a die of the superblock are expected to fail, and either replace the one or more blocks of the die with another one or more blocks from a different die or add the another one or more blocks from the different die and disable the one or more blocks of the die, and provide the superblock to the requester. The superblock provided to the requester is erased prior to the providing and is the same size as an original superblock.

Figure 1:
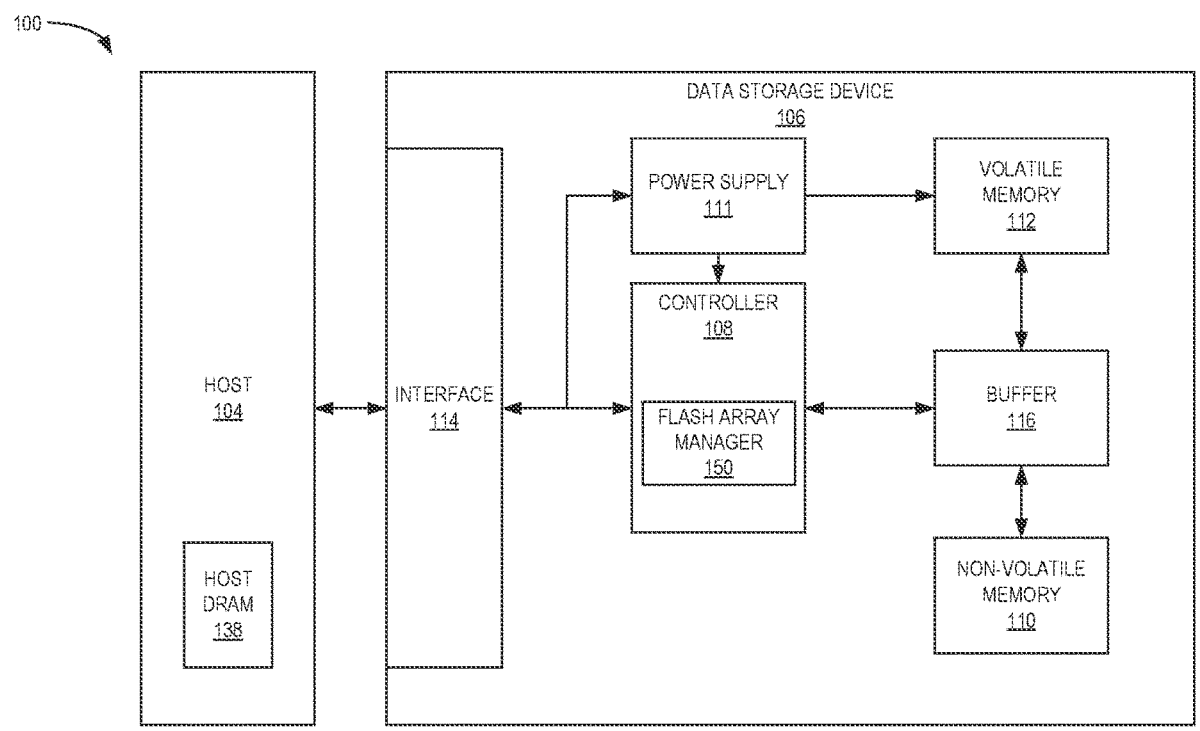
FIG. 1 is a schematic block diagram illustrating a storage system in which a data storage device may function as a storage device for a host device, according to certain embodiments.

FIG. 1 is a schematic block diagram illustrating a storage system 100 in which a host device 104 is in communication with a data storage device 106, according to certain embodiments. For instance, the host device 104 may utilize a non-volatile memory (NVM) 110 included in data storage device 106 to store and retrieve data. The host device 104 comprises a host DRAM 138. In some examples, the storage system 100 may include a plurality of storage devices, such as the data storage device 106, which may operate as a storage array. For instance, the storage system 100 may include a plurality of data storage devices 106 configured as a redundant array of inexpensive/independent disks (RAID) that collectively function as a mass storage device for the host device 104.

The host device 104 may store and/or retrieve data to and/or from one or more storage devices, such as the data storage device 106. As illustrated in FIG. 1, the host device 104 may communicate with the data storage device 106 via an interface 114. The host device 104 may comprise any of a wide range of devices, including computer servers, network attached storage (NAS) units, desktop computers, notebook (i.e., laptop) computers, tablet computers, set-top boxes, telephone handsets such as so-called "smart" phones, so-called "smart" pads, televisions, cameras, display devices, digital media players, video gaming consoles, video streaming device, or other devices capable of sending or receiving data from a data storage device.

The data storage device 106 includes a controller 108, NVM 110, a power supply 111, volatile memory 112, the interface 114, and a write buffer 116. In some examples, the data storage device 106 may include additional components not shown in FIG. 1 for the sake of clarity. For example, the data storage device 106 may include a printed circuit board (PCB) to which components of the data storage device 106 are mechanically attached and which includes electrically conductive traces that electrically interconnect components of the data storage device 106, or the like. In some examples, the physical dimensions and connector configurations of the data storage device 106 may conform to one or more standard form factors. Some example standard form factors include, but are not limited to, 3.5" data storage device (e.g., an HDD or SSD), 2.5" data storage device, 1.8" data storage device, peripheral component interconnect (PCI), PCI-extended (PCI-X), PCI Express (PCIe) (e.g., PCIe×1, ×4, ×8, ×16, PCIe Mini Card, MiniPCI, etc.). In some examples, the data storage device 106 may be directly coupled (e.g., directly soldered or plugged into a connector) to a motherboard of the host device 104.

Interface 114 may include one or both of a data bus for exchanging data with the host device 104 and a control bus for exchanging commands with the host device 104. Interface 114 may operate in accordance with any suitable protocol. For example, the interface 114 may operate in accordance with one or more of the following protocols: advanced technology attachment (ATA) (e.g., serial-ATA (SATA) and parallel-ATA (PATA)), Fibre Channel Protocol (FCP), small computer system interface (SCSI), serially attached SCSI (SAS), PCI, and PCIe, non-volatile memory express (NVMe), OpenCAPI, GenZ, Cache Coherent Interface Accelerator (CCIX), Open Channel SSD (OCSSD), or the like. Interface 114 (e.g., the data bus, the control bus, or both) is electrically connected to the controller 108, providing an electrical connection between the host device 104 and the controller 108, allowing data to be exchanged between the host device 104 and the controller 108. In some examples, the electrical connection of interface 114 may also permit the data storage device 106 to receive power from the host device 104. For example, as illustrated in FIG. 1, the power supply 111 may receive power from the host device 104 via interface 114.

The NVM 110 may include a plurality of memory devices or memory units. NVM 110 may be configured to store and/or retrieve data. For instance, a memory unit of NVM 110 may receive data and a message from controller 108 that instructs the memory unit to store the data. Similarly, the memory unit may receive a message from controller 108 that instructs the memory unit to retrieve data. In some examples, each of the memory units may be referred to as a die. In some examples, the NVM 110 may include a plurality of dies (i.e., a plurality of memory units). In some examples, each memory unit may be configured to store relatively large amounts of data (e.g., 128 MB, 256 MB, 512 MB, 1 GB, 2 GB, 4 GB, 8 GB, 16 GB, 32 GB, 64 GB, 128 GB, 256 GB, 512 GB, 1 TB, etc.).

In some examples, each memory unit may include any type of non-volatile memory devices, such as flash memory devices, phase-change memory (PCM) devices, resistive random-access memory (ReRAM) devices, magneto-resistive random-access memory (MRAM) devices, ferroelectric random-access memory (F-RAM), holographic memory devices, and any other type of non-volatile memory devices.

The NVM 110 may comprise a plurality of flash memory devices or memory units. NVM Flash memory devices may include NAND or NOR based flash memory devices and may store data based on a charge contained in a floating gate of a transistor for each flash memory cell. In NVM flash memory devices, the flash memory device may be divided into a plurality of dies, where each die of the plurality of dies includes a plurality of physical or logical blocks, which may be further divided into a plurality of pages. Each block of the plurality of blocks within a particular memory device may include a plurality of NVM cells. Rows of NVM cells may be electrically connected using a word line to define a page of a plurality of pages. Respective cells in each of the plurality of pages may be electrically connected to respective bit lines. Furthermore, NVM flash memory devices may be 2D or 3D devices and may be single level cell (SLC), multi-level cell (MLC), triple level cell (TLC), or quad level cell (QLC). The controller 108 may write data to and read data from NVM flash memory devices at the page level and erase data from NVM flash memory devices at the block level.

The power supply 111 may provide power to one or more components of the data storage device 106. When operating in a standard mode, the power supply 111 may provide power to one or more components using power provided by an external device, such as the host device 104. For instance, the power supply 111 may provide power to the one or more components using power received from the host device 104 via interface 114. In some examples, the power supply 111 may include one or more power storage components configured to provide power to the one or more components when operating in a shutdown mode, such as where power ceases to be received from the external device. In this way, the power supply 111 may function as an onboard backup power source. Some examples of the one or more power storage components include, but are not limited to, capacitors, super-capacitors, batteries, and the like. In some examples, the amount of power that may be stored by the one or more power storage components may be a function of the cost and/or the size (e.g., area/volume) of the one or more power storage components. In other words, as the amount of power stored by the one or more power storage components increases, the cost and/or the size of the one or more power storage components also increases.

The volatile memory 112 may be used by controller 108 to store information. Volatile memory 112 may include one or more volatile memory devices. In some examples, controller 108 may use volatile memory 112 as a cache. For instance, controller 108 may store cached information in volatile memory 112 until the cached information is written to the NVM 110. As illustrated in FIG. 1, volatile memory 112 may consume power received from the power supply 111. Examples of volatile memory 112 include, but are not limited to, random-access memory (RAM), dynamic random access memory (DRAM), static RAM (SRAM), and synchronous dynamic RAM (SDRAM (e.g., DDR1, DDR2, DDR3, DDR3L, LPDDR3, DDR4, LPDDR4, and the like)).

Controller 108 may manage one or more operations of the data storage device 106. For instance, controller 108 may manage the reading of data from and/or the writing of data to the NVM 110. In some embodiments, when the data storage device 106 receives a write command from the host device 104, the controller 108 may initiate a data storage command to store data to the NVM 110 and monitor the progress of the data storage command. Controller 108 may determine at least one operational characteristic of the storage system 100 and store the at least one operational characteristic in the NVM 110. In some embodiments, when the data storage device 106 receives a write command from the host device 104, the controller 108 temporarily stores the data associated with the write command in the internal memory or write buffer 116 before sending the data to the NVM 110.

Controller 108 includes a flash array manager (FAM) 150, where the FAM 150 is part of a flash translation layer (FTL). In some embodiments, the FTL may be coupled to the controller 108 and the FAM 150 is external to the controller 108 and is included in the FTL. FAM 150 is a module (e.g., component) that deals with bookkeeping and allocation of superblocks (SBs) of the NVM 110 to one or more zones. A SB is a set of blocks, which may be one or more blocks, of each die of a memory device of the NVM 110. It is contemplated that a SB may be formed by selecting one or more blocks from an available set of dies of the memory device, which may be a number of dies up to the total number of dies of the memory device. FAM 150 further maintains a list of a free SBs across the NVM 110. When a zone, as described in FIGS. 2A and 2B, requests a SB, the FAM 150 allocates a SB for the zone. In some examples, the FAM 150 may open and close SBs.

Figure 2A:
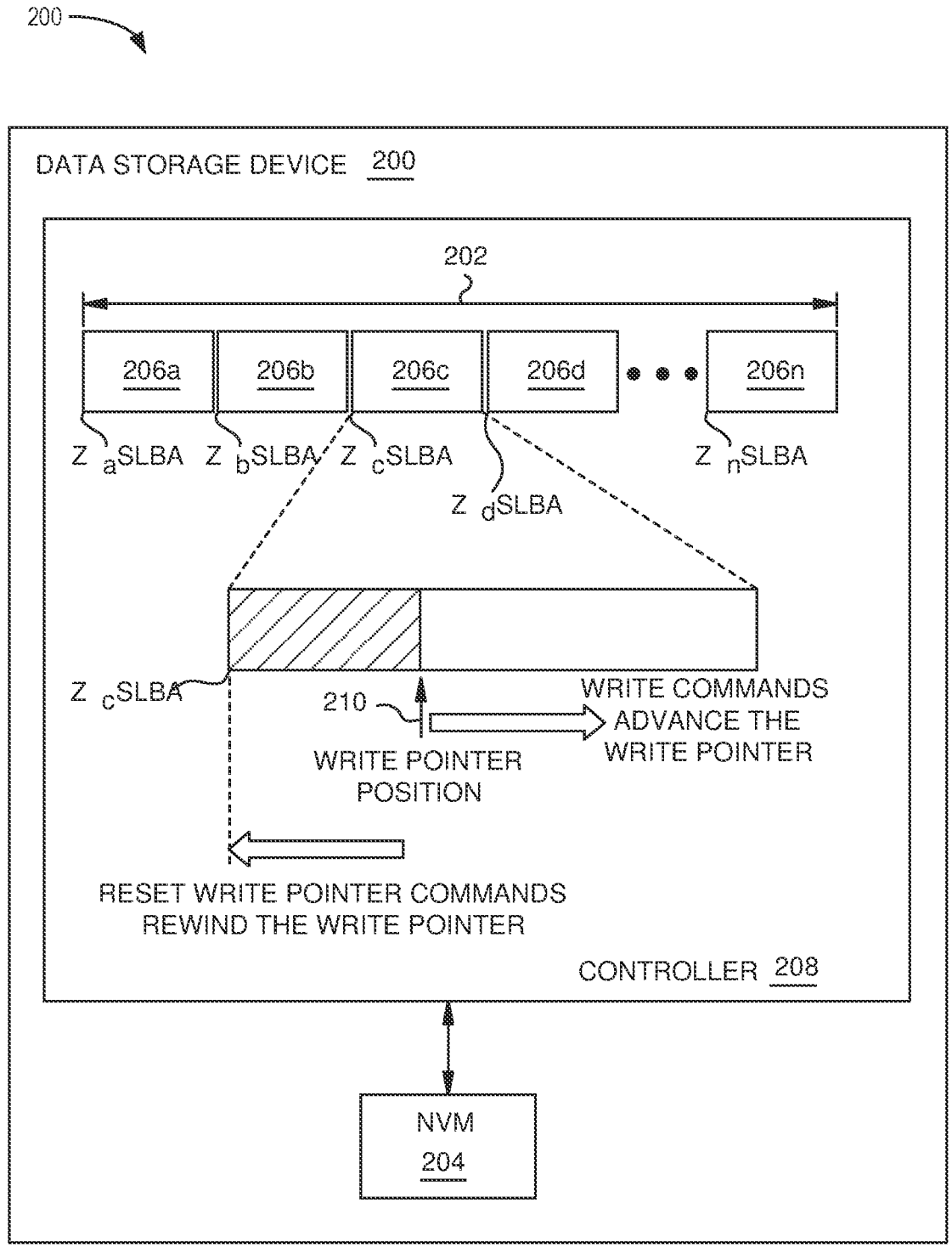
FIG. 2A is an illustration of a zoned namespace utilized in a storage device, according to certain embodiments.

FIG. 2A is an illustration of a Zoned Namespaces (ZNS) 202 view utilized in a data storage device 200, according to certain embodiments. The data storage device 200 may present the ZNS 202 view to a host device, such as the host device 104 of FIG. 1. The data storage device 200 may be the data storage device 106 of the storage system 100 of FIG. 1. The data storage device 200 may have one or more ZNS 202, and each ZNS 202 may be different sizes. The data storage device 200 may further comprise one or more conventional namespaces in addition to the one or more Zoned Namespaces 202. Moreover, the ZNS 202 may be a zoned block command (ZBC) for SAS and/or a zoned-device ATA command set (ZAC) for SATA. Host side zone activity may be more directly related to media activity in zoned drives due to the relationship of logical to physical activity possible.

In the data storage device 200, the ZNS 202 is the quantity of NVM that can be formatted into logical blocks such that the capacity is divided into a plurality of zones 206a-206n (collectively referred to as zones 206). The NVM may be the storage unit or NVM 110 of FIG. 1. Each of the zones 206 comprise a plurality of physical or erase blocks (not shown) of a memory unit or NVM 204, and each of the erase blocks are associated a plurality of logical blocks (not shown). Each of the zones 206 may have a size aligned to the capacity of one or more erase blocks of a NVM or NAND device. When the controller 208 receives a command, such as from a host device (not shown) or the submission queue of a host device, the controller 208 can read data from and write data to the plurality of logical blocks associated with the plurality of erase blocks (EBs) of the ZNS 202. Each of the logical blocks is associated with a unique LBA or sector.

In one embodiment, the NVM 204 is a NAND device. The NAND device comprises one or more dies. Each of the one or more dies comprises one or more planes. Each of the one or more planes comprises one or more erase blocks. Each of the one or more erase blocks comprises one or more wordlines (e.g., 256 wordlines). Each of the one or more wordlines may be addressed in one or more pages. For example, an MLC NAND die may use upper page and lower page to reach the two bits in each cell of the full wordline (e.g., 16 KiB per page). Furthermore, each page can be accessed at a granularity equal to or smaller than the full page. A controller can frequently access NAND in user data granularity logical block address (LBA) sizes of 512 bytes. Thus, as referred to in the below description, NAND locations are equal to a granularity of 512 bytes. As such, an LBA size of 512 bytes and a page size of 16 KiB for two pages of an MLC NAND results in 32 LBAs per wordline. However, the NAND location size is not intended to be limiting, and is merely used as an example.

When data is written to an erase block, one or more logical blocks are correspondingly updated within a zone 206 to track where the data is located within the NVM 204. Data may be written to one zone 206 at a time until a zone 206 is full, or to multiple zones 206 such that multiple zones 206 may be partially full. Similarly, when writing data to a particular zone 206, data may be written to the plurality of erase blocks one block at a time, in sequential order of NAND locations, page-by-page, or wordline-by-wordline, until moving to an adjacent block (i.e., write to a first erase block until the first erase block is full before moving to the second erase block), or to multiple blocks at once, in sequential order of NAND locations, page-by-page, or wordline-by-wordline, to partially fill each block in a parallel fashion (i.e., writing the first NAND location or page of each erase block before writing to the second NAND location or page of each erase block). This sequential programming of every NAND location is a typical non-limiting requirement of many NAND EBs.

When a controller 208 selects the erase blocks that will store the data for each zone, the controller 208 will be able to choose the erase blocks either at the zone open time, or it may choose the erase blocks as it reaches a need to fill the first wordline of that particular erase block. This may be more differentiating when the above described method of filling one erase block completely prior to starting the next erase block is utilized. The controller 208 may use the time difference to select a more optimal erase block in a just-in-time basis. The decision of which erase block is allocated and assigned for each zone and its contiguous LBAs can be occurring for zero or more concurrent zones at all times within the controller 208.

Each of the zones 206 is associated with a zone starting logical block address (ZSLBA) or zone starting sector. The ZSLBA is the first available LBA in the zone 206. For example, the first zone 206a is associated with $Z_a$SLBA, the second zone 206b is associated with $Z_b$SLBA, the third zone 206c is associated with $Z_c$SLBA, the fourth zone 206d is associated with $Z_d$SLBA, and the $n^{th}$ zone 206n (i.e., the last zone) is associated with $Z_n$SLBA. Each zone 206 is identified by its ZSLBA, and is configured to receive sequential writes (i.e., writing data to the NVM 110 in the order the write commands are received).

As data is written to a zone 206, a write pointer 210 is advanced or updated to point to or to indicate the next available block in the zone 206 to write data to in order to track the next write starting point (i.e., the completion point of the prior write equals the starting point of a subsequent write). Thus, the write pointer 210 indicates where the subsequent write to the zone 206 will begin. Subsequent write commands are 'zone append' commands, where the data associated with the subsequent write command appends to the zone 206 at the location the write pointer 210 is indicating as the next starting point. An ordered list of LBAs within the zone 206 may be stored for write ordering. Each zone 206 may have its own write pointer 210. Thus, when a write command is received, a zone is identified by its ZSLBA, and the write pointer 210 determines where the write of the data begins within the identified zone.

Figure 2B:
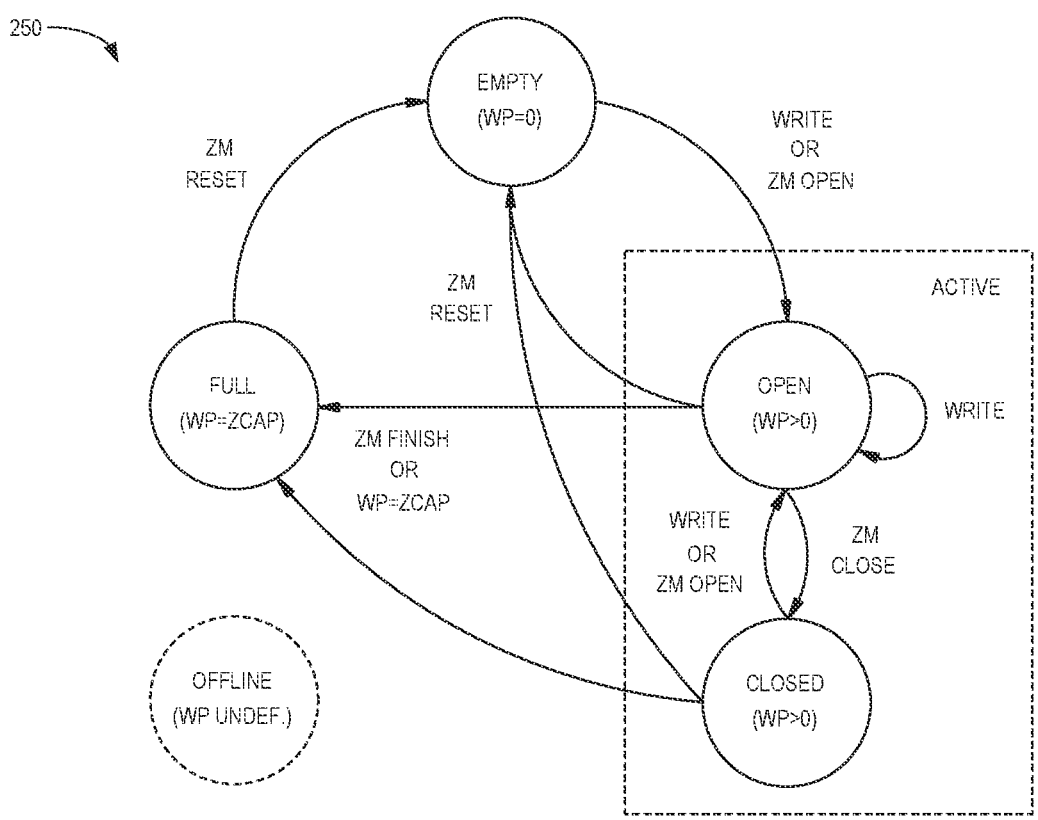
FIG. 2B is an illustration of a state diagram for the zoned namespaces of the storage device of FIG. 2A, according to certain embodiments.

FIG. 2B is an illustration of a state diagram 250 for the ZNS 202 of the data storage device 200 of FIG. 2A, according to certain embodiments. In the state diagram 250, each zone may be in a different state, such as empty, active, full, or offline. When a zone is empty, the zone is free of data (i.e., none of the erase blocks in the zone are currently storing data) and the write pointer is at the ZSLBA (i.e., WP=0). An empty zone switches to an open and active zone once a write is scheduled to the zone or if the zone open command is issued by the host. Zone management (ZM) commands can be used to move a zone between zone open and zone closed states, which are both active states. If a zone is active, the zone comprises open blocks that may be written to, and the host may be provided a description of recommended time in the active state. The controller 208 comprises the ZM. Zone metadata may be stored in the ZM and/or the controller 208.

The term "written to" includes programming user data on 0 or more NAND locations in an erase block and/or partially filled NAND locations in an erase block when user data has not filled all of the available NAND locations. The term "written to" may further include moving a zone to full due to internal drive handling needs (open block data retention concerns because the bits in error accumulate more quickly on open erase blocks), the data storage device 200 closing or filling a zone due to resource constraints, like too many open zones to track or discovered defect state, among others, or a host device closing the zone for concerns such as there being no more data to send the drive, computer shutdown, error handling on the host, limited host resources for tracking, among others.

The active zones may be either open or closed. An open zone is an empty or partially full zone that is ready to be written to and has resources currently allocated. The data received from the host device with a write command or zone append command may be programmed to an open erase block that is not currently filled with prior data. A closed zone is an empty or partially full zone that is not currently receiving writes from the host in an ongoing basis. The movement of a zone from an open state to a closed state allows the controller 208 to reallocate resources to other tasks. These tasks may include, but are not limited to, other zones that are open, other conventional non-zone regions, or other controller needs.

In both the open and closed zones, the write pointer is pointing to a place in the zone somewhere between the ZSLBA and the end of the last LBA of the zone (i.e., WP>0). Active zones may switch between the open and closed states per designation by the ZM, or if a write is scheduled to the zone. Additionally, the ZM may reset an active zone to clear or erase the data stored in the zone such that the zone switches back to an empty zone. Once an active zone is full, the zone switches to the full state. A full zone is one that is completely filled with data, and has no more available sectors or LBAs to write data to (i.e., WP=zone capacity (ZCAP)). In a full zone, the write pointer points to the end of the writeable capacity of the zone. Read commands of data stored in full zones may still be executed.

The zones may have any total capacity, such as 256 MiB, 512 MiB, or 2 GiB. However, a small portion of each zone may be inaccessible to write data to, but may still be read, such as a portion of each zone storing the parity data and one or more excluded erase blocks. For example, if the total capacity of a zone 206 is 512 MiB, then the ZCAP may be 470 MiB, which is the capacity available to write data to, while 42 MiB are unavailable to write data. In another example, if the total capacity of a zone 206 is 2 GiB, then the ZCAP may be 1077 MiB. The writeable capacity (ZCAP) of a zone is equal to or less than the total zone storage capacity. The data storage device 200 may determine the ZCAP of each zone upon zone reset. For example, the controller 208 or the ZM may determine the ZCAP of each zone. The data storage device 200 may determine the ZCAP of a zone when the zone is reset. It is to be understood that the previously listed total capacity and ZCAP values are not intended to be limiting, but to provide examples of possible embodiments.

The ZM may reset a full zone, scheduling an erasure of the data stored in the zone such that the zone switches back to an empty zone. When a full zone is reset, the zone may not be immediately cleared of data, though the zone may be marked as an empty zone ready to be written to. However, the reset zone must be erased prior to switching to an open and active zone. A zone may be erased any time between a ZM reset and a ZM open. Upon resetting a zone, the data storage device 200 may determine a new ZCAP of the reset zone and update the Writeable ZCAP attribute in the zone metadata. An offline zone is a zone that is unavailable to write data to. An offline zone may be in the full state, the empty state, or in a partially full state without being active.

Since resetting a zone clears or schedules an erasure of all data stored in the zone, the need for garbage collection of individual erase blocks is eliminated, improving the overall garbage collection process of the data storage device 200. The data storage device 200 may mark one or more erase blocks for erasure. When a new zone is going to be formed and the data storage device 200 anticipates a ZM open, the one or more erase blocks marked for erasure may then be erased. The data storage device 200 may further decide and create the physical backing of the zone upon erase of the erase blocks. Thus, once the new zone is opened and erase blocks are being selected to form the zone, the erase blocks will have been erased. Moreover, each time a zone is reset, a new order for the LBAs and the write pointer 210 for the zone 206 may be selected, enabling the zone 206 to be tolerant to receive commands out of sequential order. The write pointer 210 may optionally be turned off such that a command may be written to whatever starting LBA is indicated for the command.

Referring back to FIG. 2A, when the host device 104 sends a write command to write data to a zone 206, the controller 208 pulls-in the write command and identifies the write command as a write to a newly opened zone 206. The controller 208 selects a set of EBs to store the data associated with the write commands of the newly opened zone 206 to, and the newly opened zone 206 switches to an active zone 206. The write command may be a command to write new data, or a command to move valid data to another zone for garbage collection purposes. The controller 208 is configured to DMA read new commands from a submission queue populated by a host device.

In an empty zone 206 just switched to an active zone 206, the data is assigned to the zone 206 and the associated set of sequential LBAs of the zone 206 starting at the ZSLBA, as the write pointer 210 is indicating the logical block associated with the ZSLBA as the first available logical block. The data may be written to one or more erase blocks or NAND locations that have been allocated for the physical location of the zone 206. After the data associated with the write command has been written to the zone 206, a write pointer 210 is updated to point to the next LBA available for a host write (i.e., the completion point of the first write). The write data from this host write command is programmed sequentially into the next available NAND location in the erase block selected for physical backing of the zone.

For example, the controller 208 may receive a first write command to a third zone 206c, or a first zone append command. The host device 104 identifies sequentially which logical block of the zone 206 to write the data associated with the first command to. The data associated with the first command is then written to the first or next available LBA(s) in the third zone 206c as indicated by the write pointer 210, and the write pointer 210 is advanced or updated to point to the next available LBA available for a host write (i.e., WP>0). If the controller 208 receives a second write command to the third zone 206c, or a second zone append command, the data associated with the second write command is written to the next available LBA(s) in the third zone 206c identified by the write pointer 210. Once the data associated with the second command is written to the third zone 206c, the write pointer 210 once again advances or updates to point to the next available LBA available for a host write. Resetting the third zone 206c moves the write pointer 210 back to the $Z_c$SLBA (i.e., WP=0), and the third zone 206c switches to an empty zone.

In the description herein, the term "erase block" may be referred to as "block" for simplification purposes.

Figure 3:
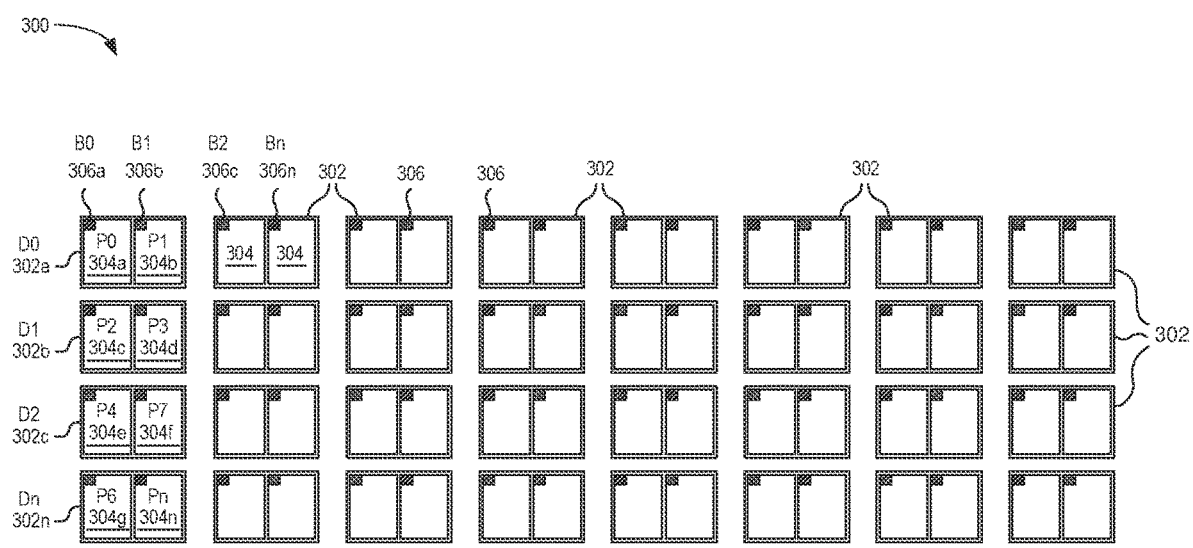
FIG. 3 is an illustration of a superblock of a memory device, according to certain embodiments.

FIG. 3 is an illustration of a superblock of a memory device 300, according to certain embodiments. The memory device 300 includes a plurality of dies 302a-302n, collectively referred to as dies 302, where each die of the plurality of dies 302a-302n includes a first plane 304a and a second plane 304b, collectively referred to as planes 304. It is to be understood that each die include more than two planes (e.g., 4 planes, 8 planes, etc.). It is to be understood that the embodiments herein may be applicable to any die architecture having one or more planes. Each of the planes 304 includes a plurality of blocks 306a-306n, collectively referred to as block 306. While 32 dies 302 are shown in the memory device 300, any number of dies may be included.

A superblock, such as the first SB 356a of FIG. 3, includes a block 306 from each plane 304 of each die 302. In some examples, a superblock may include one or more blocks 306 from each plane 304 of each die 302. Furthermore, in some embodiments, one or more dies 302 of the memory device 300 may be provisioned for storing XOR or parity data. In the description herein, a SB has the same capacity as a zone and may be referred to interchangeably, for exemplary purposes. For example, a capacity of the SB is equal to ZCAP. In some examples, a superblock has a fixed sized.

Furthermore, data is written sequentially from block to block in a first zone so that data is written to B0 306a before data is written to B1 306b. Data is also written sequentially from zone to zone so that data is written from a first zone before data is written to a second zone. A zone may have any writeable capacity (ZCAP), such as 256 MiB or 512 MiB, as discussed above. Each zone of a plurality of zones may have the same zone capacity. Data is erased in the zone capacity size when a data storage device, such as the data storage device 106 of FIG. 1, receives a zone reset request (or in some cases, generates a zone reset request as part of a data management operation, such as garbage collection). In other words, individual blocks cannot be erased unless an entire zone is erased or moved to the Zone Empty state (i.e., zone empty), as described in FIG. 2B. However, if the data storage device 106 comprises a non-volatile memory that has partial capability of ZNS, data is erased from the data storage device 106 in the zone capacity size in the portion of the non-volatile memory that has ZNS capability. Data may be erased from a non-ZNS capable non-volatile storage unit in a block size.

Furthermore, the location of the data stored in a ZNS-enabled portion of the NVM, such as the NVM 110 of FIG. 1, is recorded in a first logical to physical (L2P) table as LBAs in a volatile memory unit, such as the volatile memory 112. The location of the data stored in a non-ZNS-enabled portion of the NVM, such as the NVM 110 of FIG. 1, is recorded in a second L2P table as LBAs in a volatile memory unit, such as the volatile memory 112. The volatile memory 112 may be a DRAM unit. Furthermore, the NVM 110 may include a first L2P table that matches the first L2P table of the volatile memory 112 and a second L2P table that matches the second L2P table of the volatile memory 112. The L2P tables in the NVM 110 are updated to match the L2P tables of the volatile memory 112.

The L2P tables include pointers that point to each physical location of the data within the NVM 110. The physical location of the data is mapped in a logical array, such that the pointer address array comprises the location mapped from die to NAND location. In a block, the total number of pointers is calculated as follows: 256 WL*3 Pages/WL*4 Slots/Page*1 pointer/slot=3,072 pointers. Within a first zone at capacity comprising 62 blocks, 190,464 pointers may exist (i.e., 3,072 pointers/block*62 blocks=190,464 pointers). Each pointer comprises a certain amount of data that utilizes the available storage of the volatile memory 112 and/or the NVM 110. Although TLC memory is exemplified, the embodiments herein are not limited to TLC memory and the embodiments described herein may be applicable to other memory densities, such as SLC memory, MLC memory, QLC memory, PLC memory, and the like.

Figure 4:
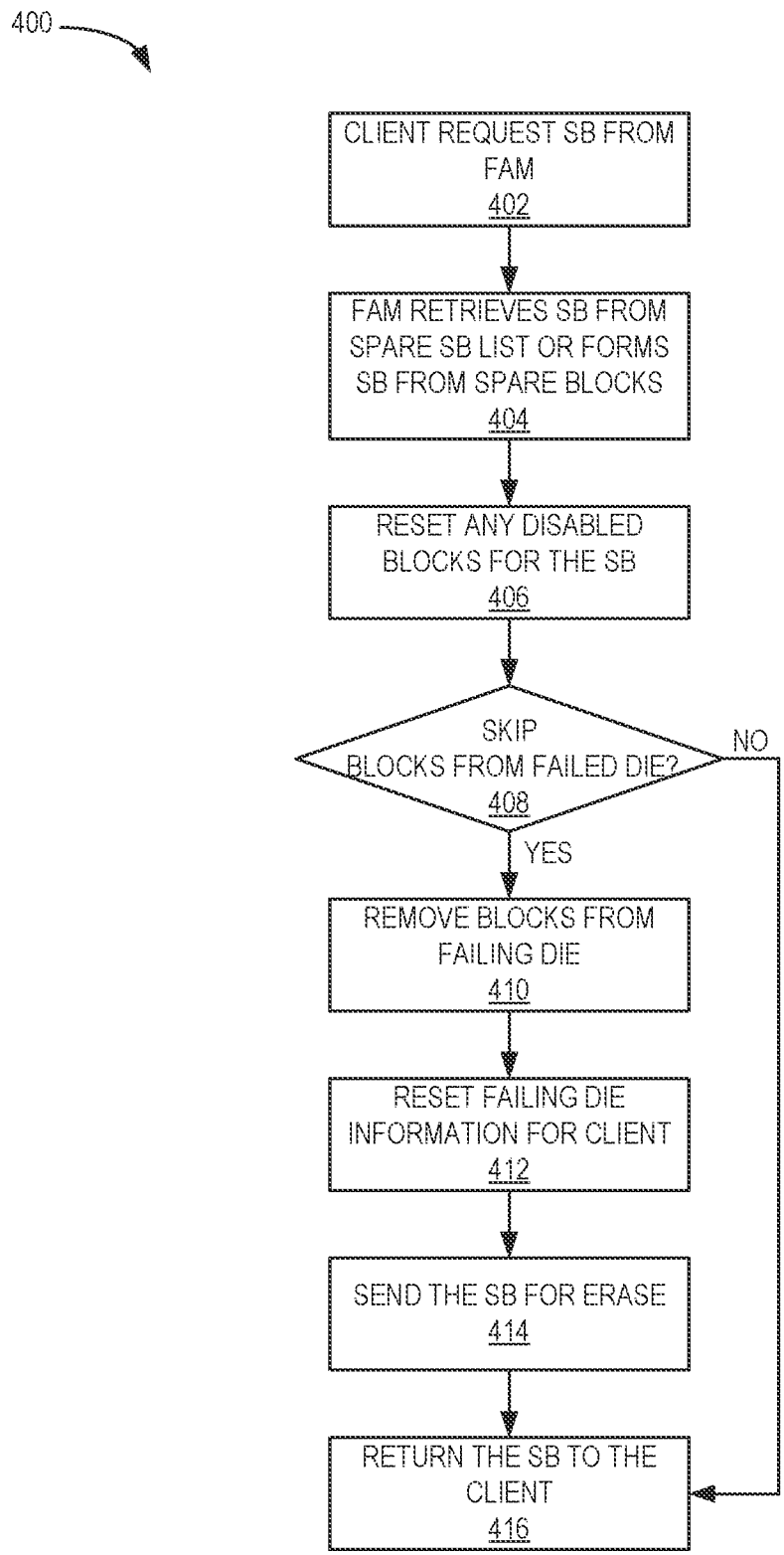
FIG. 4 is a flow diagram illustrating a method of full die recovery, according to certain embodiments.

FIG. 4 is a flow diagram illustrating a method 400 of full die recovery, according to certain embodiments. Method 400 may be executed by a controller, such as the controller 108 of FIG. 1, or a FAM, such as the FAM 150 of FIG. 1. Furthermore, aspects of the storage system 100 of FIG. 1 may be referenced for exemplary purposes.

At block 402, a client, such as the host device 104, requests a SB from the FAM 150. In the description herein, the terms "client" and "host device" may be referred to interchangeably for exemplary purposes. Furthermore, references to a "requester" herein may refer to the "client" or the "host device". For example, the request may be an explicit request, such as by a zone open command, or an indirect request, where the host device sends a command for a zone not yet opened. In some examples, a zone capacity is equal to a SB capacity having a maximum number of blocks applicable for a SB. A client may be any client that requests a SB. Internal bookkeeping modules, host write modules, recycle write modules, or logger modules that maintain a logical to physical table are some, non-limiting, examples of a client. At block 404, the FAM 150 either retrieves a SB from a spare SB list or forms a SB from spare blocks, where the spare blocks are blocks not yet allocated to a formed SB or not in use.

At block 406, the controller 108 resets (i.e., re-enables) any disabled blocks for the retrieved SB. Disabled blocks may be any erased blocks that belong to one or more dies, where some blocks of the one or more dies are determined to have one or more unacceptable characteristics, such as a failed decode from a previous operation, a temperature irregularity, a failed bit count, and the like, and are failed due to the one or more unacceptable characteristics. Hence, these one or more blocks are disabled by the FAM due to the client providing an indication that the respective blocks has a high probability of failing again, which may be due to an earlier failure on some other blocks of the same die as the one or more disabled blocks. At block 408, the controller 108 determines if there are any blocks (e.g., one or more blocks) to be skipped from a failed die of the SB. The term "skip" may refer to replaced or disabled interchangeably herein, for exemplary purposes. It is to be understood that the failed die may be one or more dies. The controller 108 may determine that there are blocks to be skipped from a failed die with information received from the host device 104. For example, after a program/erase failure is experienced by the host device 104, the host device 104 may share the failing die information with the FAM 150.

If there are no blocks to be skipped from a failed die of the SB at block 408, then the FAM 150 returns the SB to the client at block 416. However, if there are blocks to be skipped from a failed die of the SB at block 408, then the skipped blocks are removed (i.e., disabled) from an active block list of the failed die at block 410. The skipped blocks are still part of the SB, but are disabled from use by the client. The failing die information is reset for the client at block 412. At block 414, the FAM 150 sends the SB for erase. At block 416, the erased SB is returned to the client (e.g., the host device 104). Thus, the capacity of the SB provided to the client is less than the maximum possible capacity of a SB that can be provided to the client. In other words, the erased SB includes less than a maximum number of possible blocks for a SB.

Figure 5:
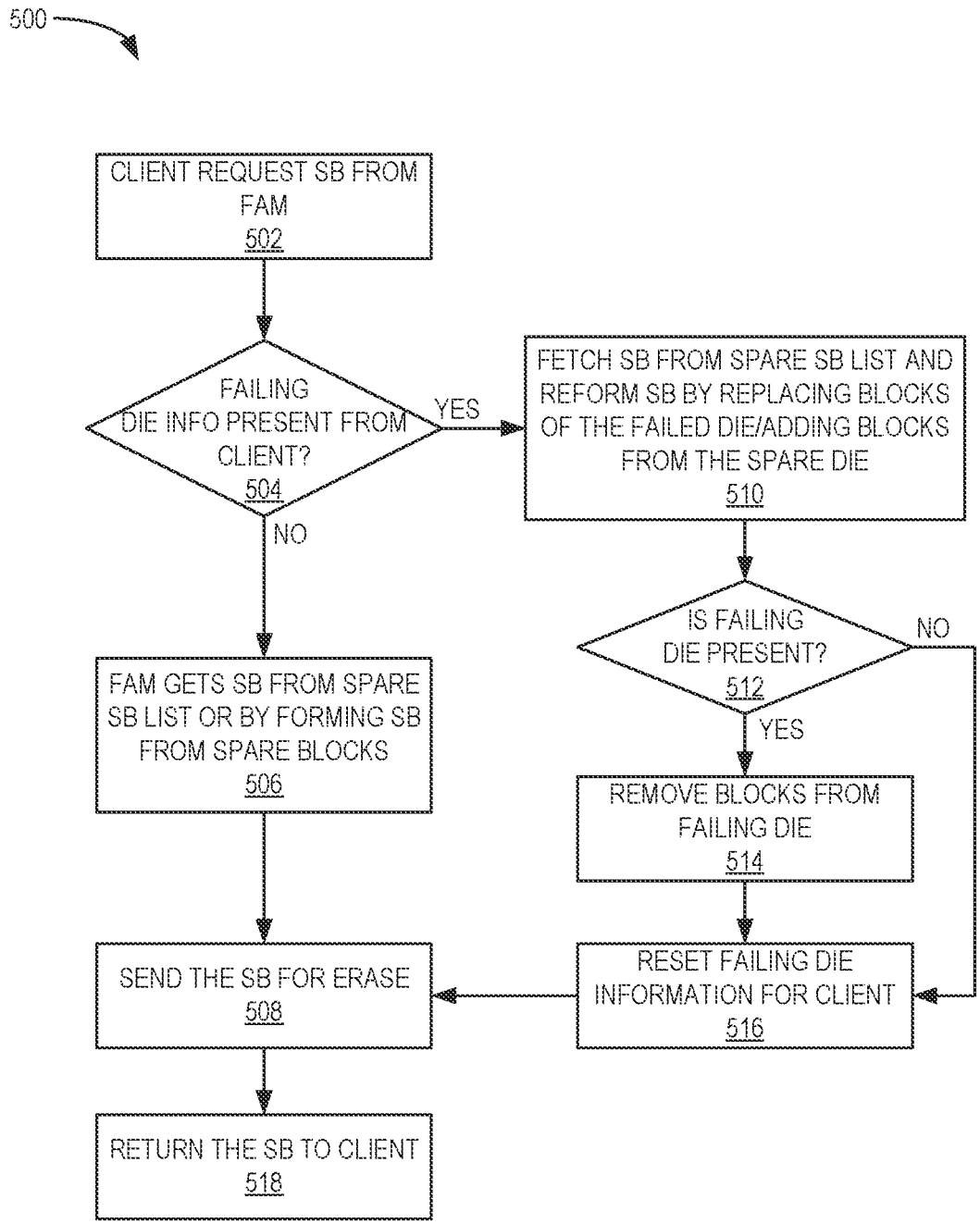
FIG. 5 is a flow diagram illustrating a method of full die recovery, according to certain embodiments.

FIG. 5 is a flow diagram illustrating a method 500 of full die recovery, according to certain embodiments. Method 500 may be executed by a controller, such as the controller 108 of FIG. 1, or a FAM, such as the FAM 150 of FIG. 1. Furthermore, aspects of the storage system 100 of FIG. 1 may be referenced for exemplary purposes.

At block 502, a client, such as the host device 104, requests a SB from the FAM 150. In the description herein, the terms "client" and "host device" may be referred to interchangeably for exemplary purposes. For example, the request may be an explicit request, such as by a zone open command, or an indirect request, where the host device sends a command for a zone not yet opened. In some examples, a zone capacity is equal to a SB capacity having a maximum number of blocks applicable for a SB. At block 504, the controller 108 or the FAM 150 determines if failing die information has been provided to the controller 108 or the FAM 150 by the host device 104.

If there has not been failing die information provided at block 504, then the FAM 150 retrieves a SB from a spare SB list or forms a SB from spare blocks at block 506. At block 508, the FAM 150 or the controller 108 sends the SB for erase. At block 518, the SB is returned to the client.

However, if there has been failing die information provided at block 504, then the FAM 150 fetches a SB from a spare SB list and reforms the SB by replacing blocks of the failed die with blocks from a missing spare die (i.e., an overprovisioned die) or adding and disabling blocks from a spare die at block 510. A method of reforming a SB is described by method 600 below.

For example, a memory device includes 32 dies and a block (or in some examples, more than one block) from each die of 31 dies of the 32 dies are used to form a SB. The previously listed number of dies as well as the number of dies in which a block or blocks are allocated to the SB are not intended to be limiting, but to provide an example of a possible embodiment. If a block associated with die 5 is failing, then the block associated with die 5 is swapped or replaced with a block of die 32. Therefore, die 32 may be considered an overprovisioning of memory utilized to replace bad blocks of a SB. It is to be understood that the exemplification of die 32 as the spare die is non-limiting and is described for exemplary purposes. For example, a block allocated from each of the dies of dies 0-10 and dies 12-32 are used to form a SB. If a block associated with die 5 is failing, then the block associated with die 5 is swapped or replaced with a block of die 11, which is missing from the formation of the SB. Therefore, the reformed SB still has one or more blocks associated with 31 dies. In another embodiment, rather than swapping a die that has a failing block with a block of a spare die, the controller 108 may add the block of the spare die while keeping the die that has the failing block in the SB. Therefore, the reformed SB may have one or more blocks from each of the 32 dies, rather than 31 dies.

At block 512, the controller 108 or the FAM 150 determines if there is still a failing die present in the reformed SB. In some examples, there may be one or more failing dies present in the reformed SB. For example, a block from a failed die may be still present in the SB when the controller 108 adds a block from the spare or missing die to the SB. For example, if a SB has a block allocated from 31 of 32 dies, then the controller 108 may either replace the failed block with a block of the missing die or add a block of the missing die to the SB without removing the die having the failed block. In some scenarios, the spare blocks list may be empty and the failing one or more blocks may not be replaced by one or more spare blocks. Thus, the reformed SB still includes failing blocks.

If there is a failing die present in the reformed SB at block 512, the blocks are removed from the failing die at block 514. Removing blocks from the failing die may include disabling the blocks of the failed die. By disabling the blocks of the failed die, the client is still provided a SB having the maximum possible capacity for a SB. For example, when the block of the missing die is added to the SB without removing the die having the failed block, the FAM 150 or the controller 108 disables the die having the failed block so that the correct size SB may be provided to the client. The failing die information is reset for the client at block 516. At block 508, the FAM 150 sends the SB for erase. At block 518, the reformed SB is returned to the client. The reformed SB may have a size equal to a maximum capacity for a SB. In some examples, the reformed SB may include one or more blocks that are disabled, where blocks that are disabled are marked as non-accessible to the host device 104.

By attempting to replace one or more blocks of one or more failed dies of a SB prior to removing the one or more blocks of the one or more failed dies from the SB, the client may be provided with a full sized SB (i.e., capacity of the SB equals the total maximum capacity of a SB) rather than a SB with a decreased total capacity. Furthermore, replacing the failing one or more blocks may minimize over-provisioning wastage.

Figure 6:
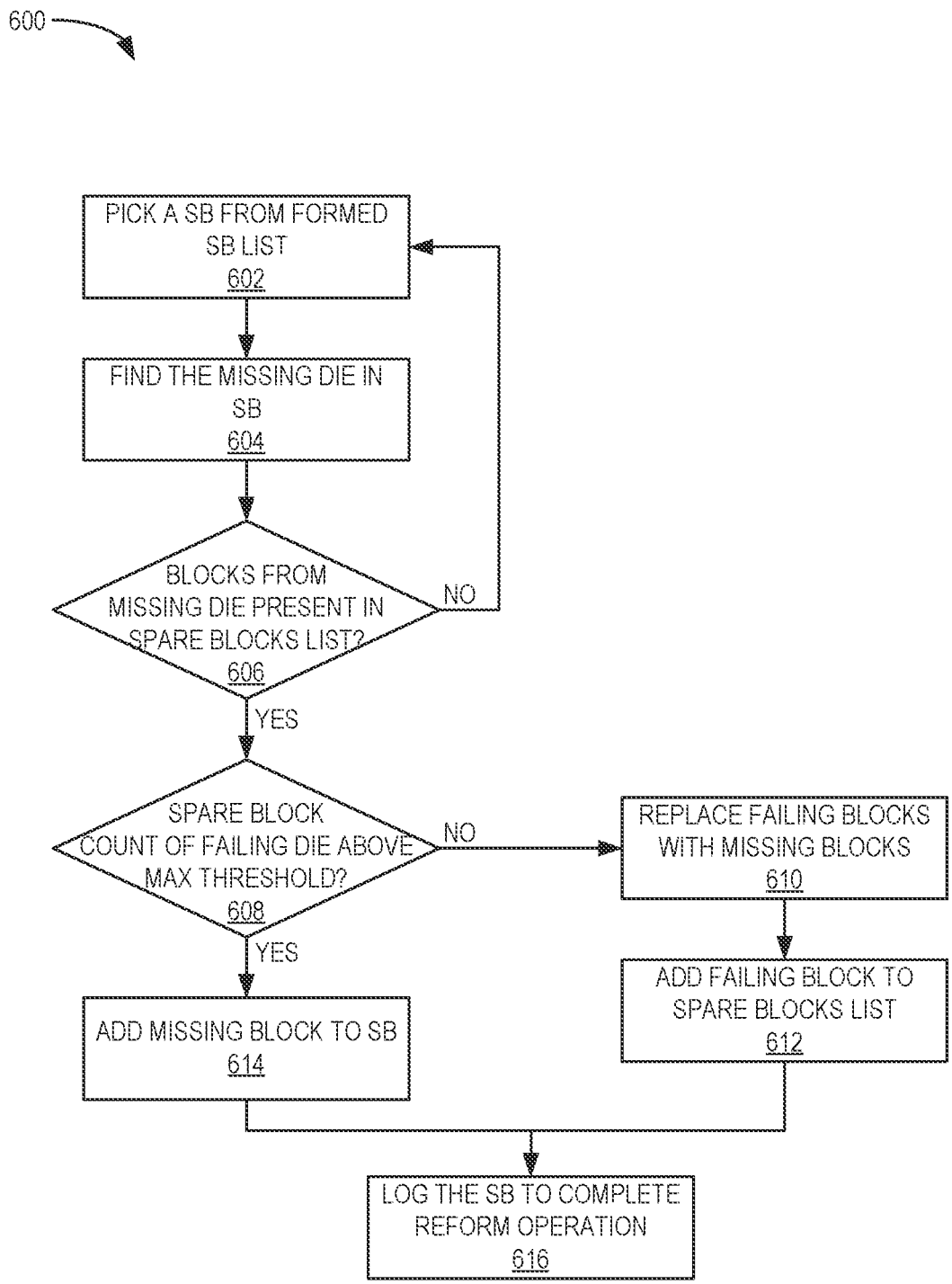
FIG. 6 is a flow diagram illustrating a method of reforming a superblock, according to certain embodiments.

FIG. 6 is a flow diagram illustrating a method 600 of reforming a superblock, according to certain embodiments. Method 600 may be executed by a controller, such as the controller 108 of FIG. 1, or a FAM, such as the FAM 150 of FIG. 1. Furthermore, aspects of the storage system 100 of FIG. 1 may be referenced for exemplary purposes. Furthermore, method 600 may describe the process executed by the FAM 150 or the controller 108 at block 510 of method 500.

At block 602, the controller 108 or the FAM 150 selects a SB from a formed SB list. The formed SB list may include one or more SBs formed by selecting one or more unallocated blocks from each die of a memory device, such as the NVM 110. In some examples, the controller 108 may iteratively search for a SB that has a spare or missing die with a number of spare blocks, where the number of spare blocks is greater than or equal to a threshold value. For example, the threshold value may be 15 spare blocks, where the controller 108 may select a different SB in the formed SB list when the first selected SB has a spare or missing die with less than 15 spare blocks.

At block 604, the controller 108 or the FAM 150 locates the missing die in the selected SB. For example, the missing die of a SB may be a die not used in the formation of the SB. In other words, if a SB is formed using dies 1-31 in a 32 die system, then the missing die is die 32. At block 606, the controller 108 or the FAM 150 determines if there are one or more blocks from one or more missing dies present in a spare blocks list, where the spare blocks list includes blocks of a die not used in the formation of the SB. If there are not blocks from the missing die present in the spare blocks list at block 606, then method 600 returns to block 602 in order to avoid returning a SB that has a capacity less than the total maximum SB capacity (i.e., missing a block of the SB).

However, if there are blocks from the missing die present in the spare blocks list at block 606, then the controller 108 or the FAM 150 determines if the spare block count of the failing die above a maximum threshold at block 608. In one example, the maximum threshold may be equal to about 15 blocks. It is to be understood that other values for the maximum threshold are contemplated and applicable to the described embodiments. If the spare block count of the failing die is above the maximum threshold at block 608, then the FAM 150 adds the missing block or blocks to the SB at block 614, where the FAM 150 later disables the missing block or blocks added. At block 616, the formed SB is logged and the reform operation is completed. Logging the formed SB may include providing the host device 104 or client with the updated formed SB information.

However, if the spare block count of the failing die is not above the max threshold at block 608, then the FAM 150 or the controller 108 replaces the failing one or more blocks with the missing one or more blocks of the missing die at block 610. At block 612, the controller 108 or the FAM 150 adds the failing one or more blocks to the spare blocks list. At block 616, the formed SB is logged and the reform operation is completed.

By reforming a selected SB to provide to a host device in response to a SB allocation request, the host device may be provided a same size superblock even when the memory device is experiencing die failure and may prevent the loss of overprovisioning.

In one embodiment, a data storage device includes a memory device and a controller coupled to the memory device. The controller is configured to receive a request from a requester for a superblock, determine that one or more blocks of a die of the superblock is failing, either replace the one or more blocks of the die with another one or more blocks from a different die or add the another one or more blocks from the different die and disable the one or more blocks of the die, and provide the superblock to the requester.

The controller comprises a flash interface module (FAM). The request is received at the FAM. The requester sends the request upon receiving a zone allocation command. The FAM is configured to provide the superblock upon receiving the request for the superblock. The controller is further configured to fetch the superblock from a spare superblock list in response to the request. The fetching includes determining a missing die in the fetched superblock, checking the missing die for a number of one or more spare blocks, verifying that the one or more spare blocks in the missing die exists, and either: providing the fetched superblock when the one or more spare blocks in the missing die exists or re-fetching another superblock from the spare superblock list until the one or more spare blocks in the missing die is present and providing the another superblock when the one or more spare blocks in the missing die is present. The controller is further configured to determine whether a spare block count of the die comprising the one or more failing blocks is equal to or above a maximum threshold for the die. The controller is further configured to add one or more missing blocks of the different die to the superblock and disable the one or more failing blocks when the spare block count of the die comprising the one or more failing blocks is equal to or above the maximum threshold. The controller is further configured to log the superblock having the added one or more missing blocks from the different die. The controller is further configured to replace the one or more failing blocks of the die with the one or more missing blocks of the different die when the spare block count of the die comprising the one or more failing blocks is below the maximum threshold. The controller is further configured to add the one or more failing blocks to a spare block list. The controller is further configured to log the superblock having the one or more replaced blocks.

In another embodiment, a data storage device includes a memory device and a controller coupled to the memory device. The controller is configured to determine that failing die information for a superblock is present for a host device, fetch the superblock from a spare superblock list, determine a location of one or more failing blocks of a die corresponding to the failing die information for the superblock, and reform the superblock.

The reforming includes replacing the one or more failing blocks with a corresponding one or more spare blocks from a different die. The reforming includes adding one or more spare blocks from a different die to the superblock. The reformed superblock is a same size as an original superblock. The reformed superblock has one or more unavailable blocks. The controller is further configured to erase the reformed superblock prior to returning the reformed superblock to the host device.

In another embodiment, a data storage device includes memory means and a controller coupled to the memory means. The controller is configured to retrieve a superblock that has a die comprising one or more failed blocks, determine if a spare block count of the die is above or equal to a maximum threshold, add one or more new blocks from a different die and disable the one or more failed blocks of the die, erase the superblock, and return the superblock to a requester.

The memory means is a memory architecture having a fixed superblock size. The retrieving is in response to receiving a zone append command from a host device. The disabled one or more failed blocks are unusable to the requester.

While the foregoing is directed to embodiments of the present disclosure, other and further embodiments of the disclosure may be devised without departing from the basic scope thereof, and the scope thereof is determined by the claims that follow.

What is claimed is:

1. A data storage device, comprising:
a memory device; and
a controller coupled to the memory device, the controller configured to:
receive a request from a requester for a superblock;
determine that one or more blocks of a die of the superblock are failing;
determine whether a spare block count of the die comprising the one or more failing blocks is equal to or above a maximum threshold for the die;
either:
replace the one or more blocks of the die with another one or more blocks from a different die; or
add the another one or more blocks from the different die and disable the one or more blocks of the die; and
provide the superblock to the requester.

2. The data storage device of claim 1, wherein the controller comprises a flash array manager (FAM), and wherein the request is received at the FAM.

3. The data storage device of claim 2, wherein the requester sends the request upon receiving a zone allocation command, and wherein the FAM is configured to provide the superblock upon receiving the request for the superblock.

4. The data storage device of claim 1, wherein the controller is further configured to fetch the superblock from a spare superblock list in response to the request, and wherein fetching comprises:
determining a missing die in the fetched superblock;
checking the missing die for a number of one or more spare blocks;
verifying that the one or more spare blocks in the missing die exists; and
either:
providing the fetched superblock when the one or more spare blocks in the missing die exists; or
re-fetching another superblock from the spare superblock list until the one or more spare blocks in the missing die is present and providing the another superblock when the one or more spare blocks in the missing die is present.

5. The data storage device of claim 1, wherein the controller is further configured to add one or more missing blocks of the different die to the superblock and disable the one or more failing blocks when the spare block count of the die comprising the one or more failing blocks is equal to or above the maximum threshold.

6. The data storage device of claim 5, wherein the controller is further configured to log the superblock having the added one or more missing blocks from the different die.

7. The data storage device of claim 5, wherein the controller is further configured to replace the one or more failing blocks of the die with the one or more missing blocks of the different die when the spare block count of the die comprising the one or more failing blocks is below the maximum threshold.

8. The data storage device of claim 7, wherein the controller is further configured to add the one or more replaced failing blocks to a spare block list.

9. The data storage device of claim 8, wherein the controller is further configured to log the superblock having the one or more replaced blocks.

10. A data storage device, comprising:
a memory device; and
a controller coupled to the memory device, the controller configured to:
determine that failing die information for a superblock is present for a host device;
fetch the superblock from a spare superblock list;
determine a location of one or more failing blocks of a die corresponding to the failing die information for the superblock; and
reform the superblock, wherein the controller is further configured to erase the reformed superblock prior to returning the reformed superblock to the host device.

11. The data storage device of claim 10, wherein the reforming comprises replacing the one or more failing blocks with a corresponding one or more spare blocks from a different die.

12. The data storage device of claim 10, wherein the reforming comprises adding one or more spare blocks from a different die to the superblock.

13. The data storage device of claim 10, wherein the reformed superblock is a same size as an original superblock.

14. The data storage device of claim 13, wherein the reformed superblock has one or more unavailable blocks.

15. A data storage device, comprising;
memory means; and
a controller coupled to the memory means, the controller configured to:
  retrieve a superblock that has a die comprising one or more failed blocks;
  determine if a spare block count of the die is above or equal to a maximum threshold;
  add one or more new blocks from a different die and disable the one or more failed blocks of the die;
  erase the superblock; and
  return the superblock to a requester.

16. The data storage device of claim 15, wherein the memory means is a memory architecture having a fixed superblock size.

17. The data storage device of claim 16, wherein the retrieving is in response to receiving a zone append command from a host device.

18. The data storage device of claim 15, wherein the disabled one or more failed blocks are unusable to the requester.

\* \* \* \* \*